United States Patent
AlGhunaimi et al.

(10) Patent No.: US 11,655,409 B2
(45) Date of Patent: May 23, 2023

(54) FORMING DRILLING FLUID FROM PRODUCED WATER

(71) Applicant: Saudi Arabian Oil Company, Dhahran (SA)

(72) Inventors: Fahd Ibrahim AlGhunaimi, Dhahran (SA); Young Chul Choi, Dhahran (SA); Regis Didier Alain Vilagines, Dhahran (SA); Khalid A. Al-Harbi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 143 days.

(21) Appl. No.: 17/030,128

(22) Filed: Sep. 23, 2020

(65) Prior Publication Data

US 2022/0089931 A1   Mar. 24, 2022

(51) Int. Cl.
| | | |
|---|---|---|
| C09K 8/05 | (2006.01) | |
| B01J 49/57 | (2017.01) | |
| B01J 41/04 | (2017.01) | |
| B01J 41/12 | (2017.01) | |
| B01J 47/06 | (2006.01) | |
| C02F 1/42 | (2006.01) | |
| E21B 21/06 | (2006.01) | |

(Continued)

(52) U.S. Cl.
CPC ............... *C09K 8/05* (2013.01); *B01J 41/04* (2013.01); *B01J 41/12* (2013.01); *B01J 47/06* (2013.01); *B01J 49/57* (2017.01); *C02F 1/42* (2013.01); *E21B 21/06* (2013.01); *E21B 43/34* (2013.01); *C02F 2001/422* (2013.01); *C02F 2103/10* (2013.01); *C02F 2303/16* (2013.01)

(58) Field of Classification Search
CPC combination set(s) only.
See application file for complete search history.

(56) References Cited

U.S. PATENT DOCUMENTS

| 3,098,716 A | 7/1963 | Gradishar et al. |
| 3,101,250 A | 8/1963 | Schoenbeck |
| 3,174,828 A | 3/1965 | Hein |

(Continued)

FOREIGN PATENT DOCUMENTS

| CN | 104520411 | 4/2015 |
| EP | 0230683 | 8/1987 |

(Continued)

OTHER PUBLICATIONS

National Geographic "How Hydraulic Fracturing Works" https://education.nationalgeographic.org/resource/how-hydraulic-fracturing-works (Mar. 2013) (Year: 2013).*

(Continued)

*Primary Examiner* — Magali P Slawski
*Assistant Examiner* — Bernadette Karen McGann
(74) *Attorney, Agent, or Firm* — Fish & Richardson P.C.

(57) ABSTRACT

A system and method for generating water concentrated in calcium bromide from produced water, to provide for drilling fluid having the calcium bromide. The technique includes flowing the produced water through a bed of ion-exchange resin to sorb bromide ions from the produced water onto the ion-exchange resin, and then regenerating the ion-exchange resin to desorb the bromide ions for combination with calcium ions to acquire an aqueous solution with calcium and bromide.

32 Claims, 5 Drawing Sheets

(51) Int. Cl.
*E21B 43/34* (2006.01)
*C02F 103/10* (2006.01)

(56) References Cited

U.S. PATENT DOCUMENTS

| | | | |
|---|---|---|---|
| 3,546,926 | A | 12/1970 | Dunavent, Jr. et al. |
| 4,253,928 | A | 3/1981 | Blytas et al. |
| 4,543,191 | A | 9/1985 | Stewart et al. |
| 4,995,952 | A | 2/1991 | Dandapani et al. |
| 5,089,781 | A | 2/1992 | Arichika et al. |
| 5,246,597 | A | 9/1993 | Jenson et al. |
| 5,431,877 | A | 7/1995 | Brücken et al. |
| 5,531,865 | A | 7/1996 | Cole |
| 6,024,850 | A * | 2/2000 | Sampson ............... C02F 1/4618 521/30 |
| 6,241,871 | B1 | 6/2001 | Donini et al. |
| 7,306,735 | B2 | 12/2007 | Baggott et al. |
| 8,685,236 | B2 | 4/2014 | Refere |
| 9,708,196 | B2 | 7/2017 | Brenize et al. |
| 10,472,576 | B2 | 11/2019 | Salu et al. |
| 2005/0006149 | A1 * | 1/2005 | Tettleton ............... E21B 21/065 175/207 |
| 2012/0273367 | A1 | 11/2012 | Themy et al. |
| 2014/0246382 | A1 | 9/2014 | Matza et al. |
| 2015/0246837 | A1 * | 9/2015 | Wregglesworth ......... C02F 9/00 210/666 |
| 2015/0360974 | A1 * | 12/2015 | Korngold ................ B01J 41/05 210/269 |
| 2018/0022606 | A1 * | 1/2018 | Elgat ....................... C01F 11/34 423/500 |
| 2018/0297266 | A1 | 10/2018 | Marr |
| 2019/0084842 | A1 * | 3/2019 | St. John ................... C02F 1/10 |

FOREIGN PATENT DOCUMENTS

| | | |
|---|---|---|
| GB | 1374010 | 11/1974 |
| JP | H11196814 | 7/1999 |
| JP | H11 196814 A * | 9/1999 |
| RU | 2078023 | 4/1997 |
| RU | 2543214 | 2/2015 |
| RU | 2543214 C2 * | 2/2015 |
| WO | WO 1993025636 | 12/1993 |
| WO | WO 02/068330 A2 * | 9/2002 |
| WO | WO 2014115133 | 7/2014 |
| WO | WO 2016054874 | 4/2016 |
| WO | WO 2016102568 | 6/2016 |

OTHER PUBLICATIONS

Https://www.introtopumps.com/pump-terms/pump-skid/ (hereinafter Intro to Pumps) (Year: 2020).*
Machine generated English language translation of RU-2543214-C2 (Year: 2015).*
Machine generated English language translation of JP H11 196814 A (Year: 1999).*
Hilal, Nidal, et al. "A combined ion exchange-nanofiltration process for water desalination: III. Pilot scale studies." Desalination 363 (2015): 58-63 (Year: 2015).*
PCT International Search Report and Written Opinion in International Appln. No. PCT/US2021/051222, dated Jan. 21, 2022, 15 pages.
4college.co.uk [online], "Bromine," retrieved from URL <http://www.4college.co.uk/as/min/bromine.php>, retrieved on Mar. 31, 2020, available on or before Feb. 25, 2020, 3 pages.
Aittola et al., "Thermal stability of ion-exchange resins," KBS Technical Reports, Jan. 1982, 96 pages.
Ge et al. "Progress on the Extraction Techniques of Bromine," International Symposium on Energy Science and Chemical Engineering (ISESCE 2015), Jan. 2015, 6 pages.
Paidar, "Membrane electrolysis—History, current status and perspective," Electrochimica Acta., Aug. 2016, 209:737-756.
Purolite.com [online], "Purolite Bromide Plus /9218," retrieved from URL <https://www.purolite.com/product-pdf/BROMIDE-PLUS-9218.pdf> retrieved on Mar. 31, 2020, available on or before Mar. 31, 2020, 1 page.
Singare et al., "Study on Halide Ions Selectivity of Industrial Grade Anion Exchange Resin Auchlite A-378," International Letters of Chemistiy, Physics and Astronomy, Mar. 2014, 11(1):44-50.
Soyluoglu, "Removal of bromide from natural waters: Bromide-selective vs. conventional ion exchange resins," Chemosphere, Jan. 2020, 238:1-9.
Vasudevan, "Membranes and Diaphragms for Electrochemical Processes (Part—1)," Res. J. Chem. Sci., Feb. 2013, 3(2): 1-3.

* cited by examiner

FORMING DRILLING FLUID FROM PRODUCED WATER

TECHNICAL FIELD

This disclosure relates to generating drilling fluid.

BACKGROUND

Drilling fluid aides the drilling of holes into a subterranean formation in the Earth crust. The holes may be labeled as a borehole or a wellbore. The drilling fluid may be called drilling mud. The hole may be drilled for the exploration or production of crude oil and natural gas. The hole may be drilled for other applications, such as a water well. During the drilling, the drilling fluid may cool and lubricate the drill bit and also carry and remove rock cuttings from the hole. The drilling fluid may provide hydrostatic pressure to prevent or reduce formation fluids from the subterranean formation entering into the hole during drilling. Drilling fluids can include completion fluids, workover fluids, drill-in fluids, and so on.

SUMMARY

An aspect relates to a method of generating calcium bromide in solution in water from produced water for a drilling fluid having the calcium bromide. The method includes processing the produced water to recover bromide ions from the produced water to give the calcium bromide in solution in water, wherein the produced water is discharged from an oil well, a gas well, or an oil and gas well. The method includes concentrating the calcium bromide in solution in water, and forming the drilling fluid from the calcium bromide in solution in water as concentrated, wherein the drilling fluid includes the calcium bromide.

Another aspect relates to a method of generating calcium bromide in solution in water from produced water for a drilling fluid having the calcium bromide. The method flows the produced water through a bed of resin including bromine-specific ion-exchange resin, and sorbs bromide ions from the produced water onto the resin, wherein the produced water includes produced water discharged from a subterranean formation. The method includes forming calcium bromide via regenerating the resin with regenerant having calcium cations and water. The regenerating of the resin with the regenerant includes flowing the regenerant through the bed of resin. The method includes discharging the calcium bromide in the water from the bed of resin, and concentrating the calcium bromide in the water to give the water concentrated in the calcium bromide for a drilling fluid having the calcium bromide.

Yet another aspect is a method of generating calcium bromide in solution in water from produced water for a drilling fluid having the calcium bromide. The method includes operating in a first mode involving sorbing bromide ions from the produced water onto ion-exchange resin in a vessel, wherein the ion-exchange resin includes bromine-specific ion-exchange resin. The method includes operating in a second mode involving regenerating the ion-exchange resin in the vessel with regenerant having calcium cations and water, wherein the regenerating releases the bromide ions from the ion-exchange resin into the water in the vessel. The second mode involves forming calcium bromide in the water in the vessel. The calcium bromide as formed includes the bromide ions released into the water from the ion-exchange resin and the calcium cations. The method includes discharging the calcium bromide in the water from the vessel, and concentrating the calcium bromide in the water for a drilling fluid having the calcium bromide. The drilling fluid may include drilling mud for drilling a well, completion fluid for completing a well, or a workover fluid for workover of a well, or any combinations thereof.

Yet another aspect relates to a method of generating calcium bromide in solution in water from produced water for a drilling fluid having the calcium bromide. The method includes receiving the produced water discharged from a subterranean formation, and subjecting the produced water to ion exchange involving sorbing bromide ions from the produced water onto ion-exchange resin and desorbing chloride ions from the ion-exchange resin into the produced water. The method includes regenerating the ion-exchange resin comprising desorbing bromide ions from the ion-exchange resin into water and sorbing chloride ions from the water onto the ion-exchange resin, wherein regenerant employed in the regenerating includes calcium chloride and the water. The method includes forming calcium bromide in the water with calcium ions from the calcium chloride and from the bromide ions as desorbed from the ion-exchange resin into the water.

Yet another aspect relates to a calcium-bromide drilling-fluid production system. The calcium-bromide drilling-fluid production system has a first vessel to store produced water from a subterranean formation, a second vessel having a bed of ion-exchange resin that is bromine-specific ion-exchange resin, and a pump to provide the produced water from the first vessel to the second vessel. The second vessel having the bed of ion-exchange resin to sorb bromide ions from the produced water onto the ion-exchange resin and desorb chloride ions from the ion-exchange resin into the produced water and discharge the produced water. The second vessel receives regenerant having calcium chloride and water to regenerate the ion-exchange resin to desorb bromide ions from the ion-exchange resin into the water to form calcium bromide in the water with calcium ions from the calcium chloride and the desorbed bromide ions. The calcium-bromide drilling-fluid production system includes a processing system having a third vessel to receive the calcium bromide in the water to concentrate the calcium bromide in the water for a drilling fluid having the calcium bromide.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
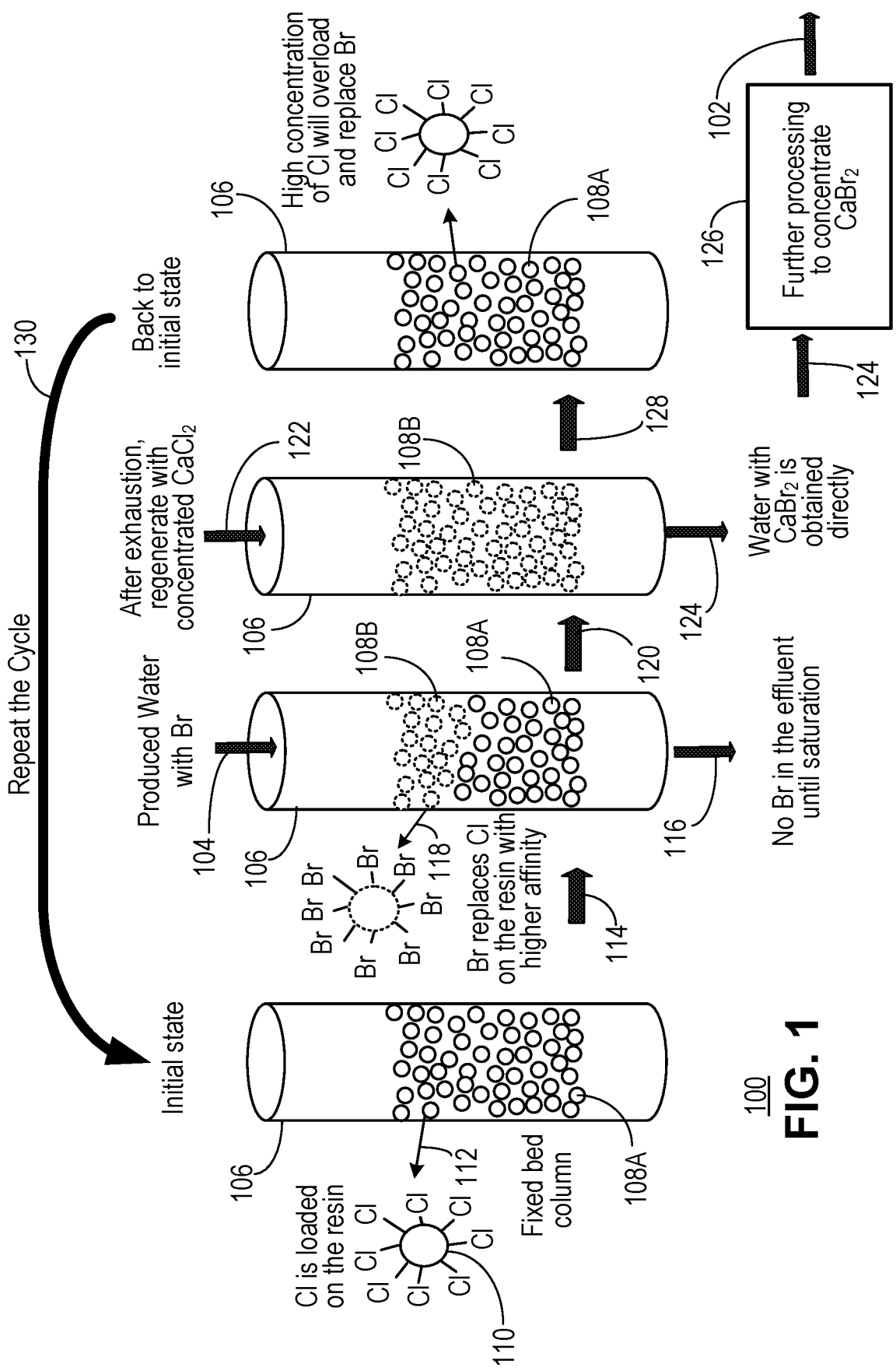
FIG. 1 is a time-sequence diagram for a system that generates drilling fluid from produced water.

The preparation of calcium-bromide drilling fluids (including calcium-bromide completion fluids) that are aqueous-based may involve adding solid calcium-bromide salt to water. However, solid calcium-bromide salt can be relatively expensive. Moreover, the manufacture of calcium-bromide salt can involve handling of strong oxidants and toxic gas. In contrast, implementations herein may generate calcium bromide in solution in water without requiring addition of solid calcium-bromide salt and generally without handling of strong oxidants or toxic gas. As discussed below, the calcium bromide in solution in water may be generated via recovery of bromide from produced water, such as by ion exchange. The generated calcium bromide in solution in water may be further processed to give a drilling fluid (e.g., drilling mud or completion fluid) including the calcium bromide.

This disclosure relates to generating calcium-bromide drilling fluid from produced water. Some aspects of the present disclosure are directed to utilizing bromine-specific ion-exchange resin to recover bromine (Br) from water (e.g., produced water) to generate calcium bromide (CaBr2) in solution in water for further processing to give a drilling fluid. This water generated having CaBr2 typically does not include solid CaBr2 but instead includes CaBr2 in solution as calcium ions and bromide ions. Similarly, the drilling fluid (formed via the additional processing) typically does not include solid CaBr2 but instead includes the CaBr2 in solution as calcium ions and bromide ions in water or in an aqueous phase. Some oilfield produced-water has relatively high levels of Br. In the ion exchange, the CaBr2 may be generated in the regeneration of the resin with a regenerant including calcium (calcium cation). The regenerant may be, for example, calcium chloride (CaCl2)) in water. During the regeneration, the product discharged from the ion exchange may be water having CaBr2 in solution. Again, this discharged water stream may generally be solids free and have the CaBr2 in solution as calcium ions and bromide ions. In implementations, this water having CaBr2 in solution may be processed to concentrate the CaBr2 for a drilling fluid having CaBr2. Thus, a drilling fluid may be generated from underground water produced at an oilfield or a gas producing field located in proximity to where the drilling fluid (having CaBr2) will be consumed or utilized.

As used herein, the term "drilling fluid" can include treatment fluids for drilling or completion activities associated with a well. The well can include a borehole or wellbore in a subterranean formation. As used herein, "drilling fluid" can include drilling fluid for drilling, completion fluid, or workover fluid. The drilling fluid can be drilling mud (e.g., typically having solid additives) for drilling a well, completion fluid (e.g., typically solids-free) for completing a well, or workover fluid, and so on. Thus, the CaBr2 drilling fluid can be a treatment fluid (e.g., a CaBr2-based treatment fluid) having CaBr2 (as calcium ions and bromide ions) and that may be drilling fluid for drilling a well, completion fluid for completing a well, or workover fluid for mitigating formation pressure during workover operations, and so forth. The drilling fluid can be water-based or an emulsion of water in oil (with the CaBr2 in the aqueous phase), and the like. The drilling fluid can include gas. The drilling fluid can include additional salts (e.g., CaCl2), zinc bromide, etc.) incorporated into the solution with the CaBr2. The drilling fluid can have additives.

A completion fluid may be a fluid place into the well (wellbore) for completion activities including final operations prior to hydrocarbon production. Such final operations may include, for example, setting screens or production liners, setting tubing, installing packers, or perforating the wellbore casing (in productions zones), and the like. Completion fluids may improve well productivity by reducing damage to the producing zone, and can help prepare, repair, clean out, and complete the wellbore during the completion phase. The completion fluid may facilitate control of a well and generally without damaging the producing formation or completion components. Workover fluids may be utilized during remedial work in the well, such as removing tubing, replacing a pump, logging, re-perforating, and cleaning out sand or other deposits. Both workover and completion fluids may be utilized in part to control the well pressure, to stop the well from blowing out during completion or workover, or to prevent the collapse of casing from formation pressure.

Embodiments employ the ion-exchange resins that are specific to bromine (Br) for the capture of bromide ion (Br$^-$) from water (e.g., produced water). In operation, oil-field produced water (having Br) may be flowed through a vessel having the resin to sorb the Br$^-$ ion onto the resin. The vessel may be a column with the resin as a bed of resin. When the resin is exhausted, e.g., fully loaded (or approaching fully loaded) with Br$^-$ ions, CaCl2) in water may be employed as regenerant to replace the Br$^-$ in the resin with chloride ion (Cl$^-$). Thus a solution of CaBr2 in water may be discharged from the ion-exchange vessel. The CaBr2 water solution may be further processed to concentrate the CaBr2 to apply the CaBr2 solution as drilling fluid. The concentrated CaBr2 solution can be utilized for a drilling fluid, for example, due to its relatively high specific-gravity.

A conventional practice of producing CaBr2 is first extracting Br from a brine by employing chlorine (Cl2), which is a strong oxidant, to convert bromide ion (Br$^-$) to Br2 gas under high temperature. Then, a solvent extracts the Br2 gas that is later utilized to produce the CaBr2. This conventional approach involves toxic gas handling generally not suitable for oilfield operations. In contrast, reliance on aqueous and ionic processes as in present embodiments may be less problematic and more compatible with oil operations. Implementations of the present techniques may rely on or utilize the ionic affinity of resins to capture and then release bromide ions, and in conjunction with CaCl2 to produce CaBr2 in a single unit rather than in multiple units that may be energy-intensive and costly to operate as in conventional systems. Some present examples may produce CaBr2 from produced water near or at oil production sites. Embodiments may provide value for oil production sites. Moreover, utilizing ion exchange to remove bromine from water and then regenerating the resin with sodium chloride (NaCl) produces sodium bromide (NaBr) in water. Embodiments herein may utilize CaCl2) for regeneration to give CaBr2 in water, which can be a desirable drilling fluid and can be obtained directly from produced water via present techniques without an excessive number of chemical processes.

Water-based drilling fluids may have a base fluid that is fresh water, seawater, brine, saturated brine, or a formation brine. The type of base fluid selected may depend, for example, on anticipated well conditions or on the specific interval of the well being drilled. Drilling fluid with CaBr2 may be a beneficial drilling fluid utilized to cool and lubricate the drill bit and to remove rock cuttings from the hole. The CaBr2 drilling fluid may have increased density to overcome formation pressures and thus maintain oil, gas, and water in place in the formation during drilling or well completion operations. In examples, CaBr2 drilling fluid may inhibit clay and shale hydration. The CaB2 fluid may be utilized to make drilling and workover fluids or brines with various densities (including at ionic saturation). The CaBr2 fluid can be blended with other brines, including sodium chloride, CaCl2), and zinc bromide. Emulsification of CaBr2 brine as the dispersed phase of oil-base or synthetic-base drilling fluids is an application.

Ion-exchange resin (or ion-exchange polymer) is a resin medium (e.g., matrix) or support structure for ion exchange, and typically is small beads. The beads may be generally spherical with a diameter, for example, of 0.25 millimeter (mm) to 1.0 mm. The ion-exchange resin (beads) may be fabricated, for example, from an organic polymer substrate. The resin may include, for instance, polystyrene (e.g., cross-lined polystyrene), acrylic polymers, or other polymers. The polystyrene may be crosslinked with, for example, divinylbenzene. The beads may be porous to provide a relatively large surface area on and in the beads. The sorption of ions "onto" the ion-exchange resin may be sorption "on" surfaces of the ion-exchange resin including "in" the ion-exchange resin matrix. An example of a bromine-specific ion-exchange resin employed in the present techniques is Purolite® Bromide Plus/9218 available from Purolite Corporation having headquarters in King of Prussia, Pa., USA. The Purolite® Bromide Plus/9218 ion-exchange resin is beads that are generally spherical and having a polymer structure that is gel polystyrene crosslinked with divinylbenzene. The particle size range reported as typical is 520 microns (μm) to 620 μm. The specific gravity reported as typical is 1.12.

Oilfield operations may utilize bromine as part of a drilling fluid formulation, which can be significant cost. Embodiments of the present techniques recover bromine (Br) from produced water for utilization in oil & gas well drilling, completion, and workover operations. An oil field or natural gas field may generate produced water that is relatively high in bromine content.

Table 1 below gives bromine-concentration data of produced water sampled at production facilities at oil/gas fields A-I in Saudi Arabia. The Br⁻ concentrations in Table 1 are given in parts per million (ppm). These Br⁻ concentrations in Table 1 are significantly greater than the Br⁻ concentration in seawater (e.g., 65 ppm). The total dissolved solids (TDS) for the samples of produced water collected at the oil/gas fields A-I is also given.

FIG. 1 is a time-sequence diagram 100 for a system that generates drilling fluid 102 (e.g., drilling mud, completion fluid, workover fluid, etc.) from produced water 104. Prior to subjecting the produced water 104 to the ion exchange, the produced water 104 may be treated (pretreatment). For example, the produced water 104 may be pre-treated to remove particles and organics. The drilling fluid 102 includes CaBr2. The drilling fluid 102 may be CaBr2 drilling fluid (or CaBr2-based drilling fluid) that can be utilized for drilling or well-completion actions.

The system depicted in FIG. 1 may be a process of generating CaBr2 solution (in water) from produced water. The system includes a vessel 106 (e.g., column) having ion-exchange resin 108A/108B that may be bromine-specific ion-exchange resin. The vessel 106 may be labeled as an ion-exchange vessel or an ion-exchange column. The ion-exchange resin 108A/108B may be a fixed bed of ion-exchange resin in the vessel 106.

In the time sequence 100, the vessel 106 is depicted at different times in operation. The resin 108A and the resin 108B are the same resin but at different states. The resin 108A (resin state 108A) is the resin loaded with chloride ions. The resin 108B (resin state 108B) is the resin loaded with bromide ions.

At an operational initial state of the system, the resin in the vessel is resin 108A loaded with chloride ions. It should be noted that in other embodiments of the system at an operational initial state, the resin 108A may be loaded with anions (e.g., hydroxide ions, etc.) other than chloride ions. An exploded view of a resin 108A particle 110 is indicated by arrow 112. As discussed, the resin particle may be generally spherical or a bead.

The operation proceeds 114 to introducing the produced water 104 into the vessel 106 and flowing the produced water 104 through the bed of resin. In implementations, this may be labeled as a first mode of operation. The produced water 104 has bromine (bromide ions), e.g., as discussed above. In this first mode, the produced water 104 may be flowed continuously through the bed of resin and discharge from the vessel 106 as effluent 116. The flow rate of the

TABLE 1

| Br⁻ concentration data in produced water | | | | | | | | |
|---|---|---|---|---|---|---|---|---|
| Oil/Gas field | | | | | | | | |
| A | B | C | D | E | F | G | H | I |
| TDS (ppm) 71,636 | 68,943 | 97,869 | 188,034 | 196,952 | 86,427 | 146,238 | 131,793 | 124,124 |
| Br (ppm) 231.1 | 235.8 | 435.2 | 589.0 | 674.3 | 680.1 | 857.5 | 818.6 | 749.2 |

As indicated, the present techniques may employ bromine-specific ion-exchange resins for the capture of bromide ions from produced water. At an initial state, the resin may have (be loaded with) chloride ions (Cl⁻). When the produced water is passed through the bed of ion-exchange resin (e.g., in a column reactor), bromide ions (Br⁻) from the produced water replace Cl⁻ on the resin. Once the binding sites on the resin are fully loaded with bromide ions, a regeneration technique may include to employ highly-concentrated NaCl to replace Br⁻ with Cl⁻ again. This regeneration will generate a NaBr solution, which may not be as desirable as a CaBr2 solution for utilization as a drilling fluid. Thus, embodiments herein may employ concentrated CaCl2) (instead of NaCl) as the regenerant such that the regeneration of the resin gives CaBr2 solution, which can be a more desirable for utilization as a drilling fluid.

produced water 104 may depend on the vessel 106 size, the ion-exchange capacity of the resin, the concentration of bromide ions in the produced water 104, and so on. Bromide ions from the produced water 104 sorb onto the resin as denoted by the reference numeral 108B. An exploded view of a resin 108B particle is indicated by arrow 118.

The resin (e.g., bromine-specific ion-exchange resin) generally has a greater affinity for bromide ions than chloride ions (or other anions). The bromide ions replace the chloride ions (or other anions if employed) on the resin. In the replacement, the chloride ions (or other anions such as hydroxide ions) may be characterized as released or desorbed from the resin. The effluent 116 generally does not have bromide ions until the resin becomes saturated (or approaches saturation) with bromide ions, e.g., when most or all of the resin 108A becomes resin 108B and the resin is thus exhausted.

A regenerating mode (e.g., second mode of operation) is implemented when the resin becomes exhausted 120. The third depiction of the vessel 106 in the time sequence 100 is shown with the resin exhausted (most or all of the resin is resin 108B). In this second mode, regenerant 122 (instead of produced water 104) is introduced into the vessel 106 and flows through the bed to regenerate the resin, e.g., to change the resin from resin 108B to resin 108A. The regenerant 122 may be CaCl2) in water giving calcium cations in the water and chloride anions in the water. The chloride anions replace the bromide ions on the resin. In other words, the bromide ions release or desorb from the resin into the water and the chloride anions may sorb onto the resin to change the resin from resin 108B to resin 108A. The concentration of the CaCl2) in the regenerant 122 is generally adequate to overcome the bromine affinity of the resin. The concentration of the CaCl2) in the supplied regenerant 122 may be, for example, as high as (or less than) 74.5 g/100 mL (at 20° C.).

Water 124 from the regenerant 122 and having CaBr2 discharges from the vessel 106. The CaBr2 in the water 124 may be the calcium cations from the regenerant 122 and the bromide ions released (desorbed) from the resin 108B into the regenerant 122 in the vessel 106. In this operational mode, the water 124 having CaBr2 may discharge from the vessel 106 until most or all of the resin in the vessel 106 is regenerated (the resin state 108B changed to resin state 108A).

Thus, water 124 having CaBr2 may be obtained from the produced water 104 via ion exchange for utilization as a drilling fluid. The concentration of the CaBr2 in the water 124 may be, for example, as high as (or less than) 13.9 g/100 ml (at 20° C.). The water 124 may have anions (e.g., Cl) from the regenerant and other impurities. The water 124 may be subjected to further processing 126 to give the CaBr2 drilling fluid 102. The further processing to concentrate CaBr2 may utilize, for example, reverse osmosis membranes or thermal evaporation. The thermal evaporation can involve a heat exchanger or vessel heat-transfer jacket to heat the water 124 to evaporate water to concentrate the CaBr2.

The processing 126 may include incorporating additives (chemicals) into the water 124 to give the drilling fluid 102 having CaBr2. The drilling fluid 102 may be CaBr2 drilling fluid 102 or CaBr2-based drilling fluid. The additives may include corrosion inhibitor, defoamer, viscosifier, and stabilized organic colloid to increase effectiveness of the CaBr2 drilling fluid 102 as a drilling fluid. The additives may include solids.

The CaBr2 drilling fluid 102 can be fluid employed in drilling, completion, or workover operations. The drilling fluid 102 can be drilling mud for drilling a borehole. The drilling fluid can be drill-in fluid for drilling through a hydrocarbon reservoir section. The drilling fluid can be completion fluid or workover fluid, and the like.

For the drilling fluid 102 (having the calcium ions and bromide ions) employed as drilling mud to drill a borehole or wellbore, the drilling fluid may include solid additives, such as clay particles and other solids. For the drilling fluid 102 employed as a completion fluid, the drilling fluid 102 may be generally solids-free in certain implementations.

The drilling fluid 102 can be water based or an emulsion of water and oil. The drilling fluid 102 can include gas. The drilling fluid can include salts (e.g., CaCl2), zinc bromide, etc.) incorporated into the solution in addition to the CaBr2.

As for the time sequence 100 of the resin system, the resin as fully (or substantially fully) regenerated 128 (changing resin state 108B to resin state 108A) in the regenerating mode gives the vessel 106 having resin 108A as in the operational initial state of the vessel 106. The operational time sequence 100 may repeat the sequence cycle, as referenced by arrow 130.

The operating temperature in the vessel 106 through the time sequence 100 may be, for example, in the range of 10° C. to 65° C. The operating pressure in the vessel 106 through the time sequence may be, for example, in the range of 0.1 bar to 15 bar. The vessel 106 may operate outside of these numerical ranges for operating conditions.

The overall mass balance associated with the ion-exchange vessel 106 can be expressed as $R—Cl+Br^- \leftrightarrow R—Br+Cl^-$, where R is the ion exchange resin. The forward reaction occurs until the saturation of the resin and the reverse reaction indicates the regeneration process. The overall regeneration can be expressed as $R—Br+CaCl2) \leftrightarrow R—Cl+CaBr2$. This present technique may be less problematic than conventional techniques discussed above that employ chlorine and handle sulfur dioxide and sulfuric acid, and also typically use a high amount of energy (e.g., for steam).

Figure 2:
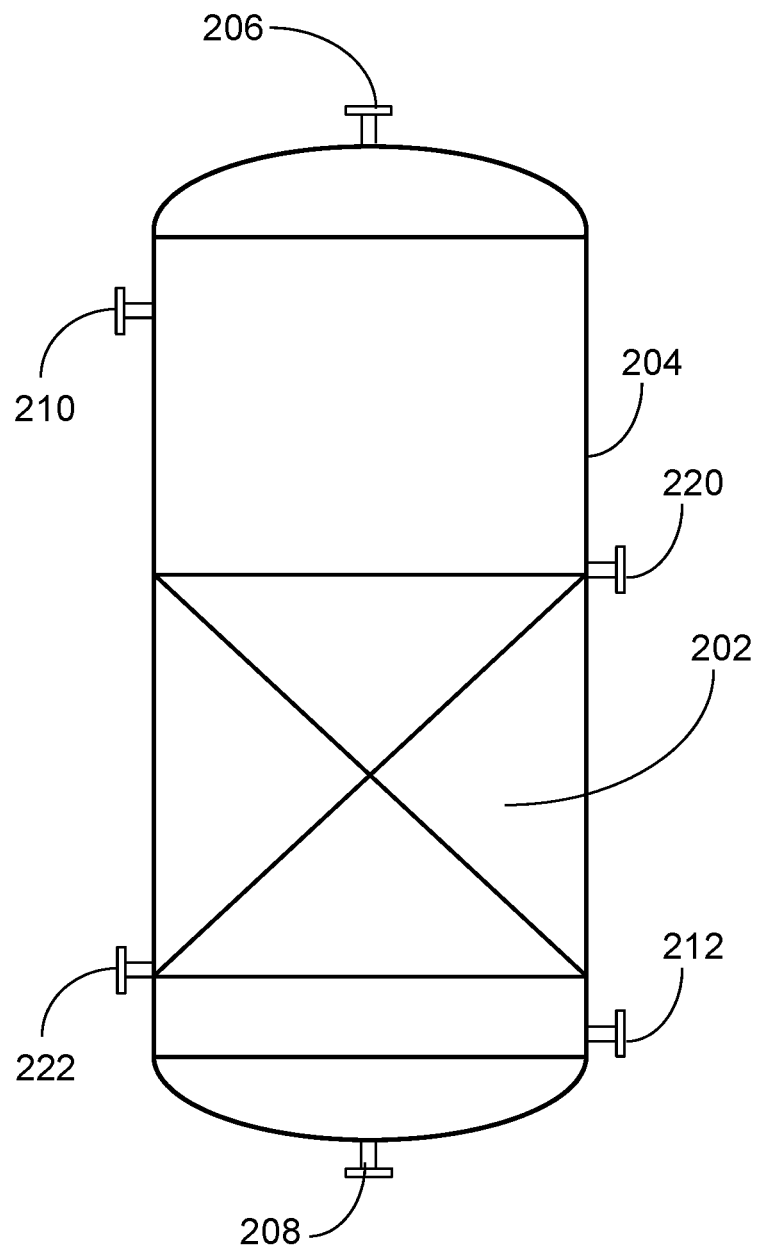
FIG. 2 is a drawing of an ion-exchange vessel.

FIG. 2 is an ion-exchange vessel 200 that may be an ion-exchange column. The ion-exchange vessel 200 may be analogous to the vessel 106 discussed with respect to FIG. 1. The ion-exchange vessel 200 includes ion-exchange resin 202 disposed in a vessel 204. The ion-exchange resin 202 may be a bed (e.g., fixed bed) of ion-exchange resin in the vessel 204. A support (e.g., porous support) in the vessel 204 may support and contain the resin 202 or bed of resin 202. The ion-exchange resin 202 may be bromine-specific ion-exchange resin and may be spherical particles or beads, as discussed above.

The vessel 204 includes a feed nozzle 206 at the top portion of the vessel 204 as an inlet for receipt of produced water into the vessel 204. The feed nozzle 206 may couple to a feed conduit (not shown) conveying the produced water to the vessel 204. The vessel 204 includes an effluent nozzle 208 to discharge effluent from the vessel 204. The effluent discharged may be analogous to the effluent 116 discussed with respect to FIG. 1. The effluent nozzle 208 may be coupled to an effluent discharge conduit (not shown) that routes the effluent discharged through the nozzle 208 from the vessel 204. The vessel 204 has a regenerant inlet nozzle 210 on an upper side portion and a spent-regenerant outlet nozzle 212 on a lower side portion. The inlet nozzle 210 may couple to a feed conduit (not shown) transporting regenerant (e.g., CaCl2) in water or other regenerant) to the vessel 204. The outlet nozzle 212 may couple to a discharge conduit (not shown) conveying the fluid (e.g., water 124 having CaBr2) discharged from the vessel 204 through the outlet nozzle 212. The nozzle orientations depicted are only exemplary. Other nozzle orientations are applicable. Moreover, in some implementations, the nozzles 206 and 210 may be the same nozzle. Likewise, the nozzles 208 and 212 may be the same nozzle. For coupling to respective external conduits, the nozzles 206, 208, 210, 212 may be flanged (as depicted) or each have a screwed connection, and so forth. Further, there may be additional nozzles on the vessel 204, such as for introduction or discharge of additional fluids or for instrumentation (e.g., pressure sensors or gauges, temperature sensors or gauges, etc.), and the like.

In operation, produced water may be fed through the nozzle 206 into the vessel 204 and the produced water flows through the bed of ion-exchange resin 202. The produced water after being subjected to the ion exchange may discharge through the nozzle 206 from the vessel 204. Once the ion-exchange resin 202 is exhausted or approaching exhaustion, regenerant may be introduced through nozzle 210 into the vessel 204. The regenerant may flow through the bed of the ion-exchange resin to regenerate the resin. The regenerant after being subjected to ion exchange and thus including spent regenerant may be discharged through the outlet nozzle 212.

The vessel 204 may be, for example, stainless steel, treated or lined carbon steel, a fiber-reinforced plastic (FRP), and so on. The grades of stainless steel (if employed) may be alloy compositions more resistant to corrosion by $CaCl_2$) or $CaBr_2$. The metallurgy of the vessel 204 can be metals or metal alloys other than stainless steel. The vessel 204 may be a cylindrical vessel. The vessel 204 may have a vertical orientation (as depicted) or a horizontal orientation. The vessel 204 may be a vertical vessel or a horizontal vessel. The vessel 204 may have heads. The vessel 204 may have a head at the top of the vessel and a head at the bottom of the vessel. The heads may be, for example, a flat plate. The plate can be welded to the vessel straight wall, or the plate can be bolted (along with an intervening gasket) to the vessel straight wall. In other examples, the heads are elliptical-type heads (as depicted) welded to the vessel straight wall, or bolted (along with an intervening gasket) to the vessel straight wall. The heads may be opened to access inside the vessel for inspection or maintenance purposes. The heads may be used to open the vessel to load or remove the resin beads. Alternatively, a nozzle 220 and a nozzle 222 may be included in vessel 204 to load the resin beads into the ion exchange vessel 200 and unload the resin beads from the ion exchange vessel 200, respectively.

The vessel 204 may be a pressure vessel. A pressure vessel may be designed and configured (e.g., with adequate wall thickness) to be subjected to an internal pressure up to a specified pressure (design pressure) greater than ambient pressure (atmospheric pressure). A pressure vessel may be rated to hold a fluid up to the design pressure. In operation, the operating pressure in a pressure vessel may generally be maintained less than the design pressure. A pressure vessel may be constructed per a formal standard or code, such as the American Society of Mechanical Engineers (ASME) Boiler & Pressure Vessel Code (BPVC) or the European Union (EU) Pressure Equipment Directive (PED).

Figure 3:
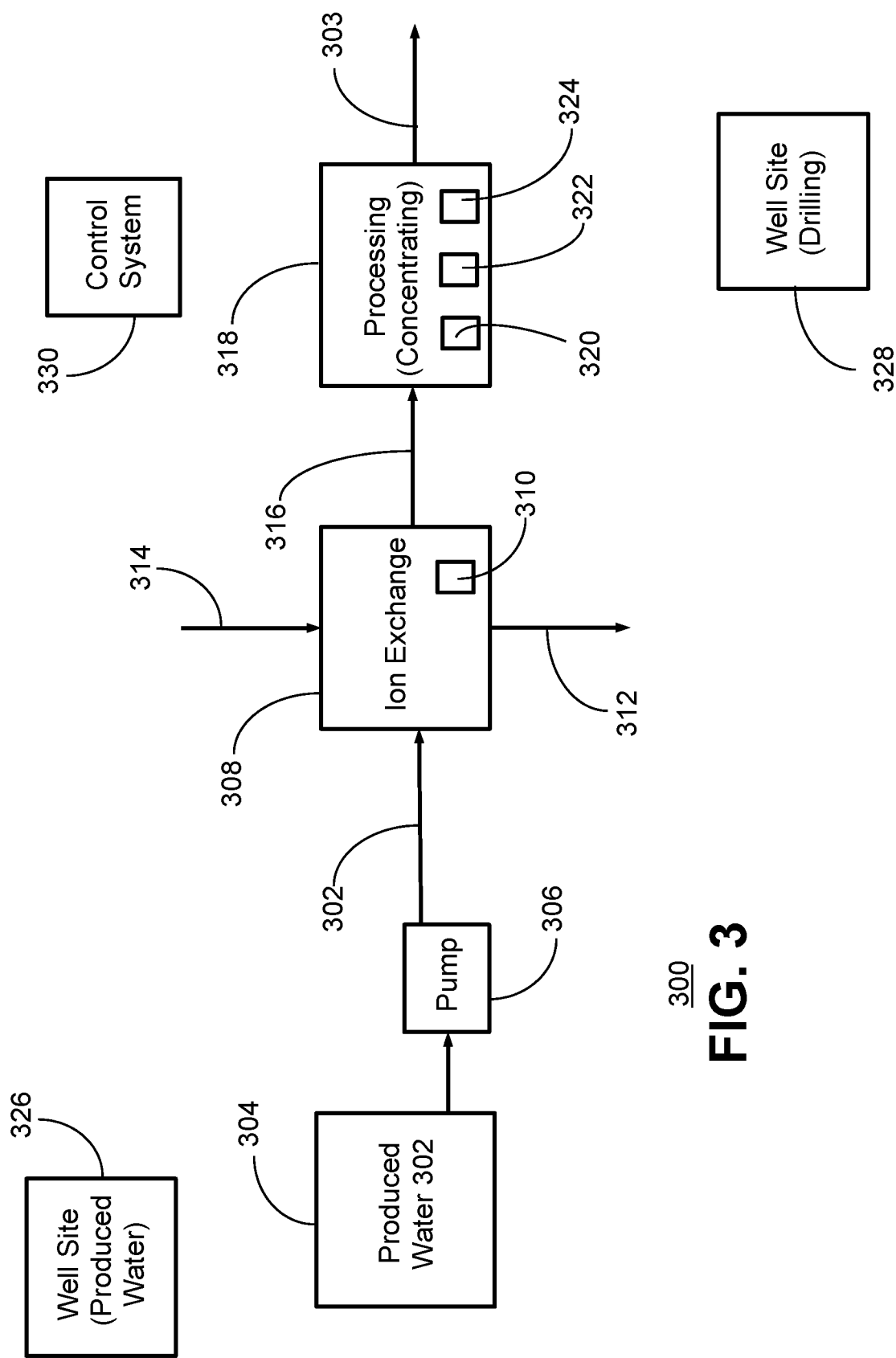
FIG. 3 is a block flow diagram of drilling-fluid production system that may process produced water to generate drilling fluid.

FIG. 3 is a system 300 (e.g., a drilling-fluid production system) that may process produced water 302 to generate $CaBr_2$ drilling fluid 303. The system 300 includes a source 304 of the produced water 302. The source 304 may be a vessel storing the produced water 302. The vessel 304 may be disposed on ground or on a vehicle. In implementations, the vessel 304 is operationally coupled to a producing well site to receive the produced water 302 as produced at the well site.

The system 300 may include a pump 306 to provide motive force for flow of the produced water 302 from the source 304 (e.g., the vessel) to an ion-exchange system 308 including to an ion-exchange vessel 310 in implementations. The pump 306 may be a centrifugal pump, a positive displacement pump, etc.

The system 300 includes the ion-exchange system 308 to receive the produced water 302. The ion-exchange system 308 has the ion-exchange vessel 310 to subject the produced water 302 to ion exchange. The ion-exchange vessel 310 may be analogous to the ion-exchange vessels 106, 200 of the FIGS. 1 and 2, respectively. As discussed, the ion-exchange resin may have an affinity for Br. The ion-exchange system 308 may have multiple ion-exchange vessels 310 operationally arranged in parallel (and/or in series). The ion-exchange system 308 and its ion-exchange vessel(s) 310 have a regeneration mode that generates $CaBr_2$ water 316 (e.g., 124 in FIG. 1) for utilization to generate drilling fluid.

In an operating mode with the resin not yet exhausted (e.g., an initial mode or first mode of the cycle), the ion-exchange system 308 receives the produced water 302 and subjects the produced water 302 to ion exchange reactions in the ion-exchange vessel(s) 310. The ion exchange in the vessel 310 may replace chloride ions (or other anions such as hydroxide ions, etc.) on the ion-exchange resin with bromide ions from the produced water 302. The ion exchange may involve sorption of bromide ions from the produced water 302 onto the ion-exchange resin and releasing (desorbing) chloride ions from the ion-exchange resin into the produced water. The produced water having the released chloride ions (and minus the sorbed bromide ions) may discharge as effluent 312 for disposal, injection, treatment, or recovery.

A regeneration mode of operation (e.g., second mode of the cycle) may be started, for example, after the resin is exhausted. A regenerant 314 instead of produced water 302 is fed to the ion-exchange vessel 310 to regenerate the ion-exchange resin. The regenerant 314 may have calcium cations concentrated in solution in water. The calcium cations generally do not participate in the regeneration but are present for giving $CaBr_2$ in solution during the regeneration cycle. The regenerant 314 may be, for example, $CaCl_2$) (and/or calcium hydroxide) in solution in water and that provides the calcium cations. The regenerant 314 may be, for example, a concentrated solution of $CaCl_2$) in water giving the calcium cations and chloride anions. The chloride anions may replace the bromide ions on the resin in the regeneration. In another example, the regenerant 314 may be, for instance, a concentrated solution of calcium hydroxide [$Ca(OH)_2$] in water giving the calcium cations and hydroxide anions. In implementations, the hydroxide anions may replace the bromide ions on the resin in the regeneration. The calcium cations with the displaced bromide ions may form $CaBr_2$ in solution in the water (e.g., in the regenerant 314 water).

The regeneration includes replacing bromide ions on the resin with the chloride anions (or hydroxide ions) to return the resin to a regenerated or initial state. The bromide ions are released (desorbed) from the resin into the regenerant 314 water. The regenerant having these recovered bromide ions (and the calcium cations in the regenerant 314 entering into the vessel 310) gives $CaBr_2$ in solution in water. Thus, $CaBr_2$ in solution in water is formed in the vessel 310. This water having $CaBr_2$ may be utilized (further processed) for drilling fluid. As indicated, it should be noted that the regenerant 314 may have calcium cations and anions other than chloride. In implementations, those anions (e.g., hydroxide ions) other than chloride may replace the bromide ions on the resin during regeneration.

Operating conditions in the vessel 310 may include an operating temperature in a range of 10° C. to 65° C. and an operating pressure in a range of 0.1 bar to 15 bar. Values outside of these ranges are applicable. Further, concentration of $CaCl_2$) (if employed) in the regenerant 314 may be less than, for example, 74.5 grams per 100 milliliters (mL) at a reference temperature of 20° C., anhydrous basis. Concentration of the $CaBr_2$ in the water 316 as discharged from the vessel 310 may be, for example, less than 13.9 grams per 100 mL at a reference temperature of 20° C. In the illustrated embodiment, the ion-exchange system 308 discharges this CaBr2 water 316 to a processing system 318. In some examples, an intermediate vessel (e.g., storage vessel, feed vessel, run tank, etc.) for the CaBr2 water 316 may be operationally disposed between the ion-exchange system 308 and the processing system 318. The respective flow rates of the inlet produced water 302, the regenerant 314, and the discharged CaBr2 water 316 may generally depend on the system capacity including, for example, production rate of the CaBr2 water 316 or CaBr2 drilling fluid 303 and in consideration of Br⁻ concentration in the inlet produced water 302.

The system 300 may include the processing system 318 to concentrate the CaBr2 in the CaBr2 water 316 to give the CaBr2 drilling fluid 303. The processing system 318 may include a heat exchanger 320 (e.g., shell- and tube heat exchanger) to heat the water 316 to vaporize a portion of the water 316 to concentrate the CaBr2 in the water 316. The heat transfer medium may be, for example, steam. The heated CaBr2 water 316 may discharge from the heat exchanger 320 to a vessel 322 (e.g., at lower pressure) to flash and remove a portion of the water from CaBr2 water 316 to concentrate the CaBr2. In another example, the heat exchanger 320 (e.g., coils) may be disposed in the vessel 322 (e.g., a heat-exchanger vessel) to heat the water 316 to vaporize and remove some of the water to concentrate the CaBr2. The vessel 322 may be an evaporator vessel in some implementations. The processing system 318 may also include a vessel 324 for incorporating additives into the CaBr2 water 316 to give the drilling fluid 303 having CaBr2. Concentration of the CaBr2 in the drilling fluid 303 may be below saturation (below the solubility limit) and not precipitate but in solution as calcium ions and bromide ions in the drilling fluid 303. This vessel 324 may have a mixer (e.g., mechanical agitator) to promote mixing of the additives with the CaBr2 water 316. The processing system 318 may discharge (e.g., from a vessel) the CaBr2-based drilling fluid 303 for utilization as drilling fluid. When the suction side of the pump 306 can be connected, by means of a set of valves, to receive the regenerant solution then the upstream pump 306 may provide motive force for the discharge of the drilling fluid 303. Alternatively, the processing system 318 may include a pump to provide motive force for the discharge of the drilling fluid 303. In one implementation, a vessel in the processing system 318 discharges the drilling fluid 303 to a well site that drills a borehole in a subterranean formation with the drilling fluid 303. Moreover, as discussed, the "drilling fluid" 303 as used herein can be a completion fluid or workover fluid.

Further, in some embodiments, the stream 303 discharged from the processing system 318 is water concentrated in CaBr2 and is not a drilling fluid until further processed downstream or at a separate site. Thus, in those embodiments, the drilling fluid 303 may instead labeled as an intermediate, an intermediate drilling fluid, or a base fluid for a drilling fluid, and so forth.

The CaBr2 drilling fluid 303 may be the drilling fluid generated (produced) by the CaBr2 drilling-fluid production system 300. The system 300 may generate CaBr2 drilling fluid 303 from the produced water 302. In embodiments, the system 300 may be a stationary system in a central location or a designated location. In other embodiments, the system may be a mobile system or have mobile components. If so, the system 300 may be skid mounted, disposed on a vehicle or trailers, or the components may be movable for reassembly, and the like.

The system 300 may be located near, e.g., within 100 kilometers (km), of the well site 326 that produced at least some of the produced water 302. In certain embodiments, the system 300 is disposed at the well site 326 that generated the produced water 302. If so, the system 300 may be operationally coupled to surface equipment (e.g., vessels, pumps, well rig, wellhead, etc.) of the well site 326.

The system 300 may be located near (e.g., within 10 km) of the well site 328 that utilizes the CaBr2 drilling fluid 303 to drill a borehole in a subterranean formation. In some embodiments, the system 300 is disposed at the well site 328 having the drilling operations. If so, the system 300 may be operationally coupled to surface equipment (e.g., vessels, pumps, drilling rig, etc.) of the well site 328 to provide the CaBr2 drilling fluid 303.

In particular implementations, the well site 326 (generating the produced water 302) and the well site 328 (utilizing the CaBr2 drilling fluid 303) may be adjacent well sites (e.g., within 1 km) or may be the same well site. If the same well site, the well site may both generate produced water 302 and utilize the CaBr2 drilling fluid 303. In that configuration, the system 300 may be operatively coupled to the generation of the produced water 302 and also the drilling operation employing the CaBr2 drilling fluid 303.

The system 300 may include a control system 330 that facilitates or directs operation of the system 300, such as the supply or discharge of flow streams (including flow rate), control of operating conditions, and so on. The control system 330 may include a processor and memory storing code (e.g., logic, instructions, etc.) executed by the processor to perform calculations and direct operations of the system 300. The processor (hardware processor) may be one or more processors and each processor may have one or more cores. The processor(s) may include a microprocessor, central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware. The control system 330 may include a desktop computer, laptop computer, computer server, programmable logic controller (PLC), distributed computing system (DSC), controllers, actuators, or control cards. The control system 330 may be communicatively coupled to a remote computing system that performs calculations and provides direction. The control system 330 may receive user input or remote-computer input that specifies the set points of control devices or other control components in the system 300. In some implementations, the control system 330 may calculate or otherwise determine the set point of the control device. The ion-exchange system 308 operating modes may be implemented via the control system 330 or via a local control (e.g., local panel) associated with the control system 330.

Lastly, the system 300 may a continuous system, batch system, or semi-batch system. The system 300 may have batch operating components and continuous operating components. The ion-exchange system 308 may operate continuously but as batch in cycling between the initial operating mode and the regeneration mode, such that the discharged stream of CaBr2 water 316 is intermittent. On the other hand, the ion-exchange system 308 may have multiple ion-exchange vessels 310 operating in parallel with offset cycles such that the discharged stream of CaBr2 water 316 is continuous. Other configurations are applicable.

Figure 4:
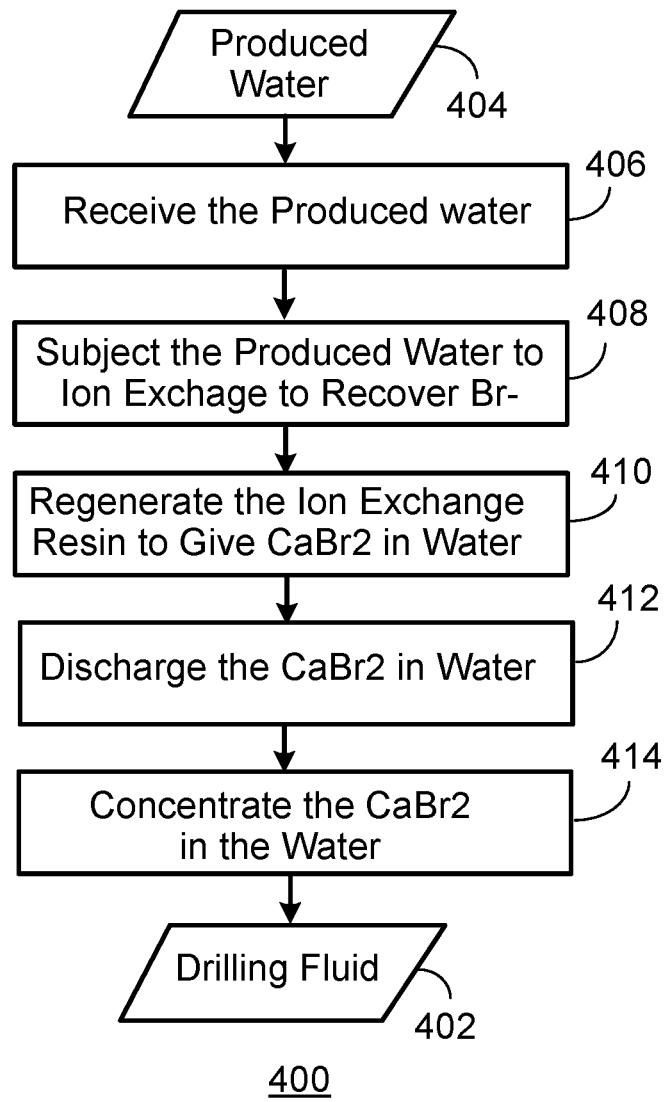
FIG. 4 is a block flow diagram of a method of generating drilling fluid from produced water.

FIG. 4 is a method 400 of generating drilling fluid 402 (e.g., having CaBr2) from produced water 404, e.g., discharged from a subterranean formation. The drilling fluid can be CaBr2 drilling fluid, CaBr2-based drilling fluid, or drilling fluid have CaBr2 as a component providing calcium ions and bromide ions. The drilling fluid 402 (having CaBr2) can be drilling mud for drilling a well, completion fluid for completing a well, or workover fluid for workover of the well. The produced water 404 may include water that existed in the subterranean formation (and was produced alongside oil or gas in some implementations). The produced water may include flowback water from the subterranean formation in well operations. The produced water 404 may be produced water discharged through a wellbore in the subterranean formation. In implementations, the produced water 404 may be produced water discharged through the wellbore in combination with hydrocarbon (e.g., crude oil or natural gas, or both) from the subterranean formation, and the produced water separated from the hydrocarbon.

At block 406, the method includes receiving the produced water 404, e.g., originating from a subterranean formation. The produced water 404 may be received from a vessel. In implementations, the produced water 404 may be pumped from the vessel. The produced water may be received from a well site having a wellbore in a subterranean formation through which the produced water was produced and discharged. The well site may be, for example, an oil well site, a gas well site, or an oil and gas well site. In one implementation, the actions of blocks 406, 408, 410, 412, 414 may be performed at the well site that generates at least some of the produced water 404. On the other hand, these actions may be performed remote from a well site.

At block 408, the method includes subjecting the received produced water 404 to ion exchange to recover bromide ions (Br$^-$) from the produced water 404. The method may include flowing the produced water through a bed of ion-exchange resin in a vessel. In the vessel, the bromide ions from the produced water 404 are sorbed onto the ion-exchange resin. Ions (e.g., chloride ions, hydroxide ions, etc.) may be released from the ion-exchange resin into the produced water. In implementations, the ion-exchange resin has an affinity for bromine. In other words, the ion-exchange resin can be a bromine-specific ion-exchange resin. The ion-exchange vessel may be disposed at the well site generating the produced water 404 or remote from the well site that generated the produced water 404.

At block 410, the method includes regenerating the ion-exchange resin to give CaBr2 in solution in water. The regeneration releases the Br$^-$ ions from the resin into the water. The calcium ions entered in the regenerant. This regeneration may occur after the ion-exchange resin is exhausted (e.g., loaded with Br$^-$ ions in the ion exchange of block 408). The method may include flowing regenerant through the bed of ion-exchange resin in the vessel. A regenerant (e.g., CaCl2) in water) may be applied to (contacted with) the ion-exchange resin to replace the Br$^-$ ions on the exhausted resin with other ions (e.g., chloride ions) from the regenerant to regenerate the resin. The Br$^-$ ions release into the regenerant. The regenerant has calcium ions (e.g., from the CaCl2)) which pair with the Br$^-$ ions to form CaBr2 solution in water.

At block 412, the method includes discharging the CaBr2 solution in water from the ion-exchange operation. The CaBr2 containing water may be utilized for drilling operations including completion operations. The CaBr2 containing water after further processing (e.g., block 414) may be employed in the drilling of a hole or borehole, or in the completion of the associated well or wellbore. The CaBr2 solution in water may be prepared (e.g., block 414) for drilling or completion. In this illustrated implementation, the CaBr2 in water is discharged to a processing system. The processing (e.g., block 414) may involve concentrating the CaBr2 among other processing actions.

At block 414, the method includes concentrating the CaBr2 in the water to give the CaBr2 drilling fluid 402 or to give a base fluid for formulation of the CaBr2 drilling fluid. As mentioned, reverse osmosis membranes or thermal evaporation, or both, may be utilized to concentrate the CaBr2 solution. Additives may be incorporated into the concentrated CaBr2 solution. In implementations, the CaBr2 solution as concentrated and incorporating additives may be employed as a drilling fluid in the drilling of a borehole in a subterranean formation, or in completion or workover operations.

The method 400 may include drilling the borehole with the CaBr2 drilling fluid 402. The method may include drilling at a well site a borehole in a subterranean formation with the drilling fluid 402. The method may include completing a well (having a wellbore in a subterranean formation) at a well site with the drilling fluid 402 as a completion fluid. The vessel having the ion-exchange resin (see blocks 408 and 410) may be disposed at the well site (in which the drilling or completion is performed) in particular implementations. In some embodiments, the above actions (blocks 406, 408, 410, 412, 414) may be performed at a well site at which the borehole is drilled (or the wellbore completed) with the drilling fluid 402.

In the oil and gas industry, a drill bit is a tool to form a borehole in subterranean formation in the Earth crust by rotary drilling. Other types of drilling are applicable. The borehole may be labeled as a hole or wellbore. The subterranean formation may be labeled as a geological formation, hydrocarbon formation, reservoir or reservoir formation, subsurface formation, Earth formation, Earth subsurface formation, and so on. The borehole (wellbore) may be formed for the discovery and extraction of hydrocarbons such as crude oil and natural gas. In borehole drilling, a drill bit is attached to a drill string, lowered into a well, and rotated in contact with a subterranean formation. In general, the rotation of a drill bit may break, grind, scrape, or fracture the subterranean formation to form the borehole (wellbore).

Figure 5:
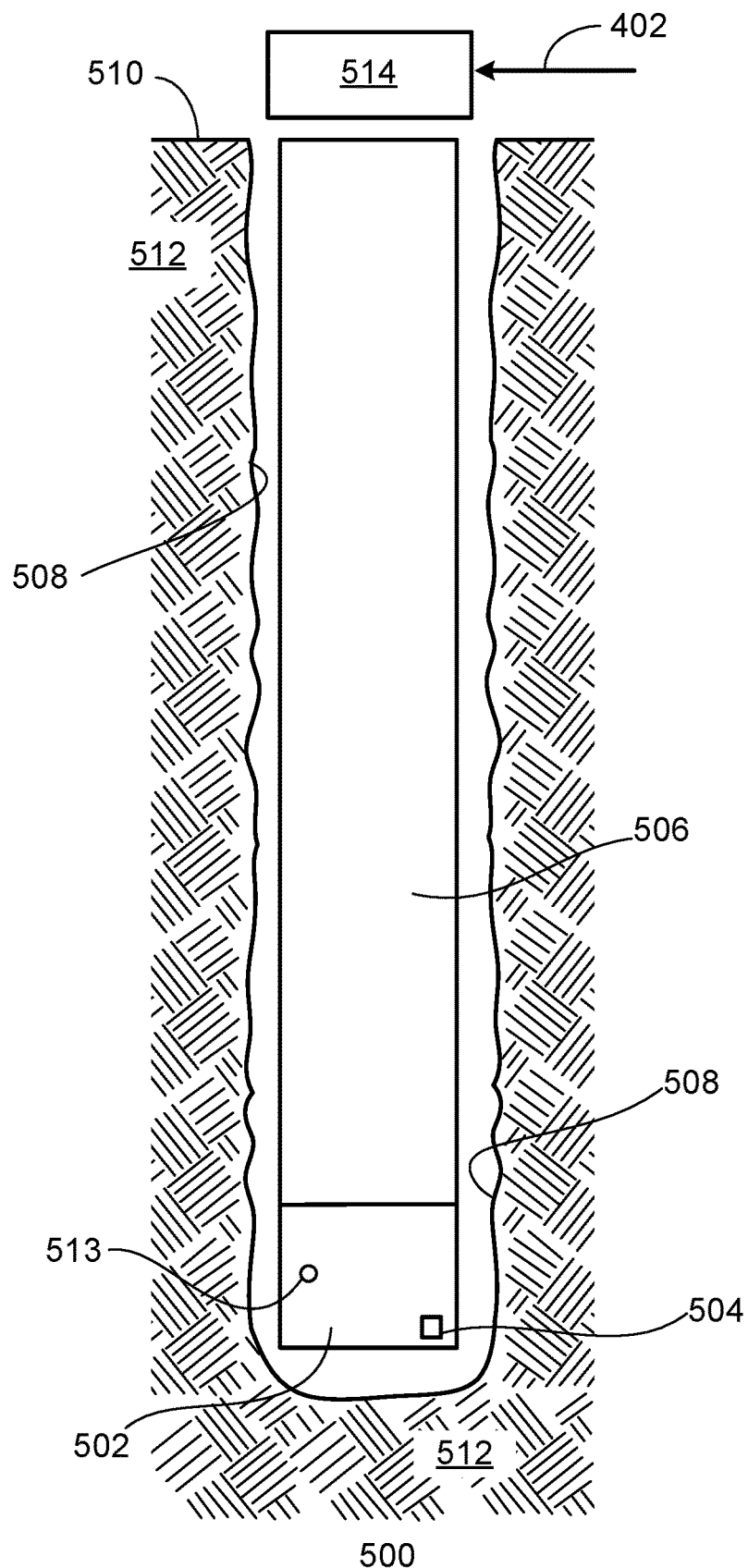
FIG. 5 is a sketch of a well site that is a drill site.

FIG. 5 is a well site 500 that is a drill site. In operation, the well site 500 may receive the drilling fluid 402 (FIG. 4). The drilling fluid 402 may be received, for example, into a vessel at the well site 500. The drilling fluid 402 may be analogous the drilling fluid 102, 303 of the preceding figures. The drilling fluid 402 may have CaBr2 and be CaBr2 drilling fluid or CaBr2-based drilling, as discussed. The drilling fluid in the following discussion of FIG. 5 may be the drilling fluid 402. Moreover, the well site 500 may be analogous to the well site 328 of FIG. 3 in certain implementations.

Well drilling or borehole drilling may form a hole in the ground for the extraction or exploration of a natural resource such as ground water, brine, natural gas, petroleum, metallic ore, and so on. The well site 500 includes surface equipment 514, such as a mounted drilling rig, piping, storage tanks, and so on, at the Earth surface 510. To form a hole in the ground, a drill bit 502 having multiple cutters 504 may be lowered into the hole and rotated to break the rock formations. In the rotation, the cutters 504 may interface with the ground or formation to grind, cut, scrape, shear, crush, or fracture rock to drill the hole. The drill bit 502 may be a component of a drill string 506 or coupled to the drill string 506. The drill bit 502 may be lowered via the drill string 506 into the wellbore 508 (borehole) to drill the wellbore 508 into a subterranean formation in the Earth crust. In operation, a drilling fluid (e.g., drilling fluid 402), also known as drilling mud, is circulated down the drill string 506 and through multiple nozzles 513 in the drill bit 502 to the bottom of the wellbore 508. The drilling fluid may then flow upward towards the surface 510 through an annulus between the drill string 506 and the wall of the wellbore 508. The drilling fluid may cool the drill bit 502, apply hydrostatic pressure upon the formation penetrated by the wellbore 508 to prevent or reduce fluids from flowing into the wellbore 508, reduce the torque and the drag force induced by the friction between the drill string 506 and the wellbore 508, carry the formation cuttings up to the surface 510, and so forth. The wellbore 508 diameter may be, for example, in a range from about 3.5 inches (8.9 centimeters) to 30 inches (76 centimeters), or outside of this range. The depth of the wellbore 508 can range from 300 feet (100 meters) to more than 30,000 feet (9,100 meters). Once the wellbore 508 is drilled, the wellbore 508 may be completed. Certain implementations of the drilling fluid (e.g., 402) may be utilized as a completion fluid.

An embodiment is a method of generating calcium bromide in solution in water from produced water for a drilling fluid having the calcium bromide. The method includes processing the produced water to recover bromide ions from the produced water to give the calcium bromide in solution in water, wherein the produced water is discharged from an oil well, a gas well, or an oil and gas well. The method includes concentrating the calcium bromide in solution in water, and forming the drilling fluid from the calcium bromide in solution in water as concentrated, wherein the drilling fluid includes the calcium bromide. In implementations, the processing of the produced water may involve subjecting the produced water to ion exchange to recover the bromide ions, and wherein a regenerant in the ion exchange has calcium cations to give the calcium bromide in solution in water. In certain implementations, the method may include drilling a borehole in a subterranean formation with the drilling fluid at a well site, completing a wellbore in the subterranean formation with the drilling fluid at the well site, or implementing workover of the wellbore with the drilling fluid, or any combinations thereof. In particular implementations, the processing of the produced water to recover the bromide ions may be performed at the well site in which the drilling fluid is utilized.

Another embodiment is a method of generating drilling fluid from produced water and ion-exchange resin regenerant. An aqueous fluid including CaBr2 is generated, which is processed to concentrate the CaBr2 to give calcium-bromide drilling fluid. The produced water utilized includes produced water discharged from a subterranean formation. The produced water discharged from the subterranean formation may include produced water discharged through a wellbore in the subterranean formation. For produced water discharged through a wellbore, the produced water may be discharged in combination with hydrocarbon including crude oil or natural gas, or both, from the subterranean formation, and the produced water separated from the hydrocarbon. The regenerant includes calcium cations and water. The regenerant may include calcium chloride in solution in the water, wherein the CaCl2) gives the calcium cations and chloride anions. The method includes flowing the produced water through a bed of resin including bromine-specific ion-exchange resin, and sorbing bromide ions from the produced water onto the resin. In implementations, sorbing bromide ions from the produced water onto the resin involves replacing chloride ions on the resin with the bromide ions. The method includes forming CaBr2 via regenerating the resin with the regenerant. The regenerating involves flowing the regenerant through the bed of resin. The flowing of the regenerant through the bed of resin may involve contacting the resin with the regenerant and releasing the bromide ions from the resin into the regenerant via the contacting of the regenerant with the resin. The regenerating of the resin with the regenerant may involve replacing the bromide ions on the resin with chloride anions from the regenerant. The regenerating of the resin with the regenerant may include desorbing the bromide ions from the resin into the regenerant, wherein forming the CaBr2 via regenerating the resin includes giving calcium and bromide in solution in the regenerant water with the calcium cations from the regenerant and with the bromide ions desorbed from the resin. The method includes discharging the CaBr2 in the regenerant water from the bed of resin (e.g., discharged from a vessel having the bed of resin). The method includes concentrating the CaBr2 in the discharged water for a drilling fluid having the CaBr2. The drilling fluid may be calcium-bromide based, and wherein the drilling fluid may be drilling mud for drilling a well, completion fluid for completing the well, or workover fluid for workover of the well, or any combinations thereof.

Yet another embodiment is a method producing drilling fluid from produced water and regenerant. The regenerate has calcium cations and water. The regenerant may include CaCl2) in the water, wherein the CaCl2) provides the calcium cations. The method may include receiving the produced water from a well site having a wellbore in a subterranean formation through which the produced water was produced, wherein the well site may be an oil well site, a gas well site, or an oil and gas well site. The method includes operating in a first mode including sorbing bromide ions from produced water onto ion-exchange resin in a vessel, wherein the ion-exchange resin includes bromine-specific ion-exchange resin. The method includes operating in a second mode including: (a) regenerating the ion-exchange resin in the vessel with the regenerant wherein the regenerating includes releasing the bromide ions from the ion-exchange resin into the water in the vessel; and (b) forming CaBr2 in the water in the vessel, wherein the CaBr2 includes the bromide ions released into the water from the ion-exchange resin and the calcium cations. The regenerating of the ion-exchange resin may involve sorbing chloride anions from the regenerant onto the ion-exchange resin. The releasing of the bromide ions may involve desorbing the bromide ions from the ion-exchange resin. The method includes discharging the CaBr2 in the water from the vessel, and concentrating the CaBr2 in the water as discharged to give a drilling fluid including calcium-bromide drilling fluid. In implementations, the method includes drilling a borehole in a subterranean formation with the drilling fluid, completing a wellbore in a subterranean formation with the drilling fluid, or implementing workover of the wellbore with the drilling fluid, or any combinations thereof. The method may include drilling at a well site a borehole in a subterranean formation with the drilling fluid or completing the borehole with the drilling fluid, or a combination thereof, wherein the vessel is disposed at the well site.

Yet another embodiment is a method including receiving produced water discharged from a subterranean formation, and subjecting the produced water to ion exchange involving sorbing bromide ions from the produced water onto ion-exchange resin and desorbing chloride ions from the ion-exchange resin into the produced water. The receiving of the produced water discharged from a subterranean formation may involve receiving the produced water from a well site having a wellbore in the subterranean formation through which the produced water was discharged. In implementations, the produced water is discharged in combination with hydrocarbon including crude oil or natural gas, or both, from the subterranean formation through the wellbore. The method includes regenerating the ion-exchange resin including desorbing bromide ions from the ion-exchange resin into water and sorbing chloride ions from the water onto the ion-exchange resin, wherein regenerant employed in the regenerating includes CaCl2) and the water. The method includes forming CaBr2 in the water with calcium ions from the CaCl2) and the bromide ions as desorbed from the ion-exchange resin into the water. The method may include concentrating the CaBr2 in the water to give drilling fluid including calcium-bromide drilling fluid. The method may include drilling a borehole with the drilling fluid, completing a well with the drilling fluid, or performing workover of a well with the drilling fluid. The method may include subjecting the produced water to ion exchange, regenerating the ion-exchange resin, forming the CaBr2 in the water, and concentrating the calcium bromide in the water at a well site where a borehole is drilled with the drilling fluid or a well is completed with the drilling fluid. The method may include subjecting the produced water to ion exchange, regenerating the ion-exchange resin, forming the CaBr2 in the water, and concentrating the CaBr2 in the water at a well site that produces the produced water from the subterranean formation. The drilling fluid may include drilling mud for drilling a well, completion fluid for completing the well, or workover fluid for workover of the well, or any combinations thereof.

Yet another embodiment is a calcium-bromide drilling-fluid production system, including: (a) a first vessel to store produced water from a subterranean formation; (b) a pump (e.g., centrifugal pump) to provide the produced water from the first vessel to a second vessel having a bed of ion-exchange resin that is bromine-specific ion-exchange resin; and (c) the second vessel having the bed of ion-exchange resin sorbs bromide ions from the produced water onto the ion-exchange resin and desorbs chloride ions from the ion-exchange resin into the produced water and discharges the produced water, wherein the second vessel receives regenerant including CaCl2) and water to regenerate the ion-exchange resin to desorb bromide ions from the ion-exchange resin into the water to form CaBr2 in the water with calcium ions from the CaCl2) and the desorbed bromide ions; and (d) a processing system including a third vessel to receive the CaBr2 in the water to concentrate the CaBr2 in the water to give a drilling fluid including calcium-bromide drilling fluid. In implementations, the ion-exchange resin sorbs chloride ions from the CaCl2). The third vessel may include a heat exchanger to heat the water to evaporate a portion of the water to concentrate the CaBr2. Alternatively, the third vessel may discharge the calcium-bromide water into a reverse osmosis membrane system to separate a portion of the water to concentrate the CaBr2 solution for use as a drilling fluid. The third vessel may discharge the drilling fluid (or an intermediate of the drilling fluid) to a well site for drilling of a borehole in a subterranean formation. The first vessel may be operationally coupled to a well site to receive the produced water as produced at the well site. The processing system may be operationally coupled to a well site to provide the drilling fluid to the well site, wherein the well site includes a drill site.

A number of implementations have been described. Nevertheless, it will be understood that various modifications may be made without departing from the spirit and scope of the disclosure.

What is claimed is:

1. A method of generating calcium bromide in solution in water from produced water for a drilling fluid having the calcium bromide, the method comprising:
   processing produced water comprising bromide ions to recover the bromide ions, wherein the produced water is discharged from an oil well, a gas well, or an oil and gas well, wherein the processing comprises flowing the produced water through a vessel having resin comprising bromine-specific ion-exchange resin, sorbing bromide ions from the produced water onto the resin, desorbing chloride ions from the resin into the produced water, and discharging the produced water as processed from the vessel;
   flowing a regenerant comprising calcium chloride in solution in water through the vessel for regenerating the resin, wherein the regenerating comprises desorbing bromide ions from the resin into the water and sorbing chloride ions from the calcium chloride in the water onto the resin;
   discharging the water from the vessel from the regenerating, the water as discharged comprising calcium ions from the calcium chloride and the bromide ions desorbed from the resin into the water giving calcium bromide in solution in the water via the regenerating;
   concentrating the calcium bromide in solution in the water; and
   forming a drilling fluid from the calcium bromide in solution in the water as concentrated, wherein the drilling fluid comprises the calcium bromide.

2. The method of claim 1, further comprising:
   producing hydrocarbon along with underground water comprising bromide ions from a subterranean formation, wherein the hydrocarbon comprises crude oil or natural gas, or both, wherein the produced water discharged from the oil well, the gas well, or the oil and gas well comprises the underground water; and
   separating the underground water as produced from the hydrocarbon as produced to give the produced water comprising bromide ions, and wherein the drilling fluid is for drilling a borehole with a drill bit.

3. The method of claim 1, further comprising drilling a borehole in a subterranean formation via a drill bit with the drilling fluid at a well site, completing a wellbore in the subterranean formation with the drilling fluid as a completion fluid at the well site, or implementing workover of the wellbore with the drilling fluid as a workover fluid, or any combinations thereof.

4. The method of claim 3, wherein the produced water comprises bromide ions in a range of 231.1 parts per million (ppm) to 857.5 ppm, and wherein processing the produced water to recover the bromide ions is performed at the well site.

5. A method of generating calcium bromide in solution in water from produced water for a drilling fluid having the calcium bromide, the method comprising:
   flowing produced water discharged from a subterranean formation and comprising bromide ions through a bed of resin comprising bromine-specific ion-exchange resin;
   sorbing the bromide ions from the produced water onto the resin and discharging the produced water from the bed of resin without the bromide ions sorbed onto the resin;
   giving calcium bromide in solution in water via regenerating the resin with regenerant comprising calcium cations, chloride anions, and the water, wherein regenerating the resin comprises flowing the regenerant through the bed of resin, desorbing bromide ions from the resin into the water, and sorbing chloride ions from the water onto the resin;

discharging the calcium bromide in solution in the water from the bed of resin, the calcium bromide comprising the calcium cations that entered the bed of resin in the water and the bromide ions desorbed from the resin; and concentrating the calcium bromide in the water to give the water concentrated in the calcium bromide in solution for the drilling fluid having the calcium bromide in solution.

6. The method of claim 5, further comprising producing the produced water from the subterranean formation via an oil well, a gas well, or an oil and gas well, wherein the regenerant comprises calcium chloride in solution in the water, and wherein the calcium chloride gives the calcium cations and the chloride anions.

7. The method of claim 5, wherein the produced water as discharged from the subterranean formation comprises bromide ions in a range of 231.1 parts per million (ppm) to 857.5 ppm, and wherein regenerating the resin with the regenerant comprises replacing the bromide ions on the resin with the chloride anions from the water.

8. The method of claim 7, wherein flowing the regenerant through the bed of resin comprises contacting the resin with the regenerant and releasing the bromide ions from the resin into the water via the contacting of the regenerant with the resin.

9. The method of claim 5, wherein regenerating the resin with the regenerant comprises desorbing the bromide ions from the resin into the water, and wherein giving the calcium bromide via regenerating the resin comprises giving the calcium bromide in solution in the water as the calcium cations from the water and the bromide ions desorbed from the resin.

10. The method of claim 5, wherein the produced water discharged from the subterranean formation is discharged through a wellbore in the subterranean formation, and wherein sorbing bromide ions from the produced water onto the resin comprises replacing anions comprising chloride anions on the resin with the bromide ions.

11. The method of claim 10, wherein the produced water discharged through the wellbore discharged in combination with hydrocarbon comprising crude oil or natural gas, or both, from the subterranean formation, and the produced water separated from the hydrocarbon, wherein the drilling fluid comprises calcium-bromide drilling fluid or calcium-bromide based drilling fluid, and wherein the drilling fluid comprises drilling mud for drilling via a drill bit a well, completion fluid for completing the well, or workover fluid for workover of the well, or any combinations thereof.

12. A method of generating calcium bromide in solution in water from produced water for a drilling fluid, the method comprising:

operating in a first mode comprising:

sorbing bromide ions from produced water comprising bromide ions onto ion-exchange resin in a vessel, wherein the ion-exchange resin comprises bromine-specific ion exchange resin; and discharging the produced water from the vessel without the bromide ions sorbed onto the ion-exchanger resin;

operating in a second mode comprising:

regenerating the ion-exchange resin in the vessel with regenerant comprising calcium cations and water, wherein the regenerating comprises releasing the bromide ions from the ion-exchange resin into the water in the vessel;

forming the calcium bromide in solution in the water in the vessel, the calcium bromide comprising the bromide ions released into the water from the ion-exchange resin and the calcium cations;

discharging the calcium bromide in solution in the water from the vessel; and concentrating the calcium bromide in solution in the water for the drilling fluid comprising the calcium bromide in solution in the water.

13. The method of claim 12, further comprising receiving the produced water from a well site comprising a wellbore in a subterranean formation through which the produced water was produced, wherein the well site comprises an oil well site, a gas well site, or an oil and gas well site, wherein the produced water comprises bromide ions in a range of 231.1 parts per million (ppm) to 857.5 ppm.

14. The method of claim 12, further comprising:

forming the drilling fluid comprising the calcium bromide in solution in the water; and drilling a borehole in a subterranean formation via a drill bit with the drilling fluid, completing a wellbore in a subterranean formation with the drilling fluid, or implementing workover of the wellbore with the drilling fluid, or any combinations thereof.

15. The method of claim 12, wherein the regenerant comprises calcium chloride in solution in the water, the calcium chloride providing the calcium cations, and wherein releasing the bromide ions comprises desorbing the bromide ions from the ion-exchange resin.

16. The method of claim 15, further comprising producing the produced water from a subterranean formation via an oil well, a gas well, or an oil and gas well, wherein an operating temperature in the vessel is in a range of 10° C. to 65° C., wherein an operating pressure in the vessel is in a range of 0.1 bar to 15 bar, wherein concentration of calcium chloride in the regenerant is less than 74.5 grams per 100 milliliters (mL) at a reference temperature of 20° C., anhydrous basis, and wherein concentration of the calcium bromide in the water as discharged from the vessel is less than 13.9 grams per 100 mL at a reference temperature of 20 ° C.

17. The method of claim 12, wherein regenerating the ion-exchange resin comprises sorbing chloride anions from the regenerant onto the ion-exchange resin.

18. The method of claim 17, further comprising drilling at a well site a borehole in a subterranean formation via a drill bit with the drilling fluid or completing the borehole with the drilling fluid, or a combination thereof, and wherein the vessel is disposed at the well site.

19. A method of generating calcium bromide in solution in water from produced water for a drilling fluid, the method comprising:

receiving produced water comprising bromide ions discharged from a subterranean formation;

subjecting in a vessel the produced water to ion exchange comprising sorbing bromide ions from the produced water onto ion-exchange resin disposed in the vessel and desorbing chloride ions from the ion-exchange resin into the produced water in the vessel, wherein the ion-exchange resin comprises bromine-specific ion-exchange resin;

discharging the produced water from the vessel without the bromide ions sorbed onto the ion-exchange resin;

providing regenerant comprising calcium chloride in water to the vessel;

regenerating via the regenerant in the vessel the ion-exchange resin comprising desorbing bromide ions from the ion-exchange resin into the water in the vessel and sorbing chloride ions from the water in the vessel onto the ion-exchange resin; and giving the calcium bromide in solution in the water via the regenerating and as discharged from the vessel, the calcium bromide comprising calcium ions from the calcium chloride and the bromide ions as desorbed from the ion-exchange resin into the water in the vessel.

20. The method of claim 19, further comprising concentrating the calcium bromide in solution in the water as discharged from the vessel to give the water concentrated in the calcium bromide in solution for a drilling fluid comprising the calcium bromide.

21. The method of claim 20, further comprising:
producing hydrocarbon along with underground water comprising bromide ions from the subterranean formation, wherein the hydrocarbon comprises crude oil or natural gas, or both, wherein the produced water discharged from the subterranean formation comprises the underground water;
separating the underground water as produced from the hydrocarbon as produced to give the produced water comprising the bromide ions; and
drilling via a drill bit a borehole with the drilling fluid or completing a well with the drilling fluid, or a combination thereof.

22. The method of claim 20, wherein subjecting the produced water to ion exchange, regenerating the ion-exchange resin, giving the calcium bromide in solution in the water, and concentrating the calcium bromide in solution in the water are performed at a well site that a borehole is drilled via a drill bit with the drilling fluid or a well is completed with the drilling fluid.

23. The method of claim 20, wherein subjecting the produced water to ion exchange, regenerating the ion-exchange resin, giving the calcium bromide in solution in the water, and concentrating the calcium bromide in solution in the water are performed at a well site that produces the produced water from the subterranean formation.

24. The method of claim 19, wherein receiving the produced water discharged from the subterranean formation comprises receiving the produced water from a well site comprising a wellbore in the subterranean formation through which the produced water was discharged.

25. The method of claim 24, wherein the produced water discharged in combination with hydrocarbon comprising crude oil or natural gas, or both, from the subterranean formation through the wellbore, wherein the produced water as discharged and received comprises bromide ions in a range of 231.1 parts per million (ppm) to 857.5 ppm, and wherein the drilling fluid comprises drilling mud for drilling a well, completion fluid for completing the well, or workover fluid for workover of the well, or any combinations thereof.

26. A system for calcium-bromide drilling-fluid production and drilling a borehole, comprising:
an ion-exchange vessel to receive produced water comprising bromide ions, the ion-exchange vessel having a bed of ion-exchange resin that is bromine-specific ion-exchange resin to sorb bromide ions from the produced water onto the ion-exchange resin and desorb chloride anions from the ion-exchange resin into the produced water, and the ion-exchange vessel to discharge the produced water without the bromide ions sorbed onto the ion-exchange resin, wherein the ion-exchange vessel to receive regenerant comprising calcium cations and chloride anions in water to regenerate the ion-exchange resin to desorb bromide ions from the ion-exchange resin into the water to form calcium bromide in solution in the water with the calcium cations in the water and the bromide ions as desorbed;
a processing system comprising:
a vessel to receive the calcium bromide in solution in the water to concentrate the calcium bromide in solution in the water to give the water concentrated in the calcium bromide for a drilling fluid comprising the calcium bromide; and
an additive vessel to incorporate additives into the drilling fluid; and
a drill bit to drill a borehole with the drilling fluid.

27. The system of claim 26, further comprising:
a source vessel to store the produced water comprising bromide ions from a subterranean formation; and
a centrifugal pump to provide the produced water from the source vessel to the ion-exchange vessel, wherein the ion-exchange resin to sorb chloride anions from the regenerant comprising the calcium cations and the chloride anions in water.

28. The system of claim 27, wherein the produced water from the subterranean formation and as stored in the source vessel comprises bromide ions in a range of 231.1 parts per million (ppm) to 857.5 ppm, and wherein the regenerant comprises calcium chloride in solution in the water giving the calcium ions in the water of the regenerant and the chloride ions in the water of the regenerant.

29. The system of claim 26, wherein the vessel comprises a heat exchanger to heat the water to evaporate a portion of the water to concentrate the calcium bromide.

30. The system of claim 26, wherein the processing system is configured to discharge the drilling fluid to a well site for drilling the borehole via the drill bit with the drilling fluid.

31. The system of claim 27, wherein the source vessel is operationally coupled to a well site to receive the produced water as produced at the well site.

32. The system of claim 26, wherein the processing system is operationally coupled to a well site to provide the drilling fluid to the well site, and wherein the well site comprises a drill site to drill the borehole via the drill bit with the drilling fluid comprising the calcium bromide in water.

* * * * *